Nov. 4, 1958  F. C. HOLTZ ET AL  2,858,983
TELEMETER REGISTER FOR METERS
Filed Sept. 30, 1954  3 Sheets-Sheet 1
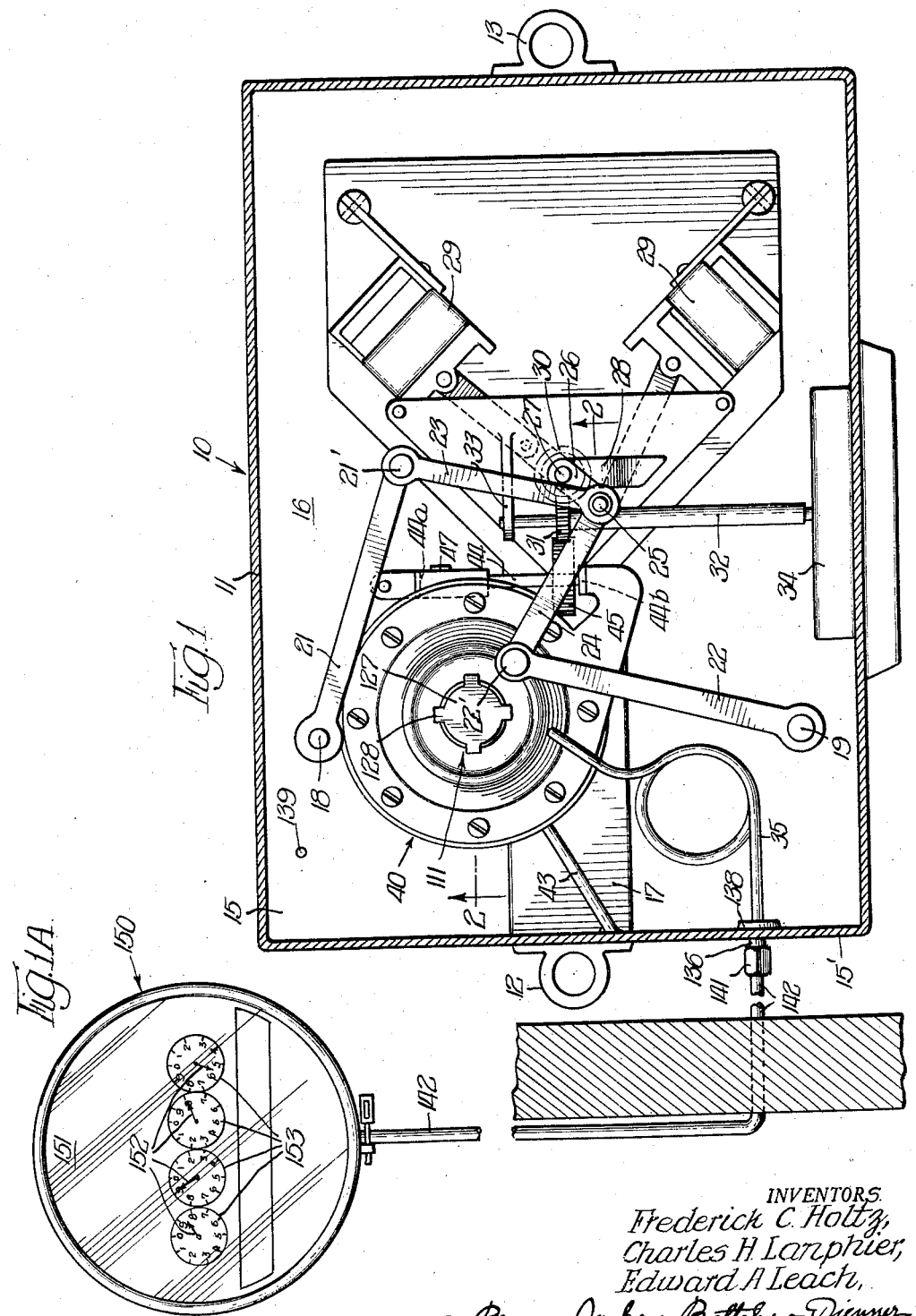
INVENTORS.
Frederick C. Holtz,
Charles H. Lanphier,
Edward A. Leach,
By Brown, Jackson, Boettcher + Dienner
Attys Nov. 4, 1958  F. C. HOLTZ ET AL  2,858,983
TELEMETER REGISTER FOR METERS
Filed Sept. 30, 1954  3 Sheets-Sheet 2
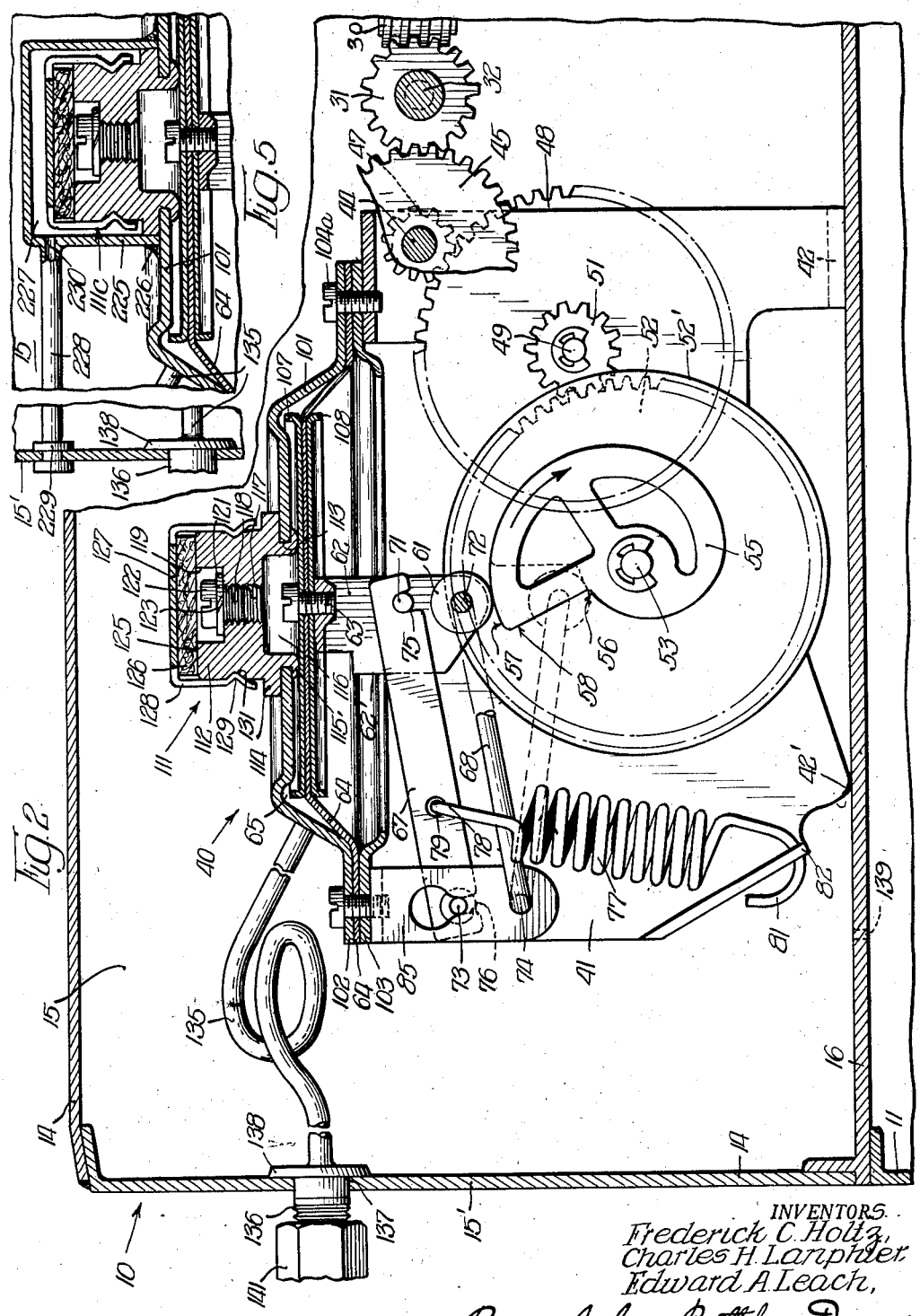
INVENTORS.
Frederick C. Holtz,
Charles H. Lanphier,
Edward A. Leach,
By Brown, Jackson, Boettcher & Drenner
Attys

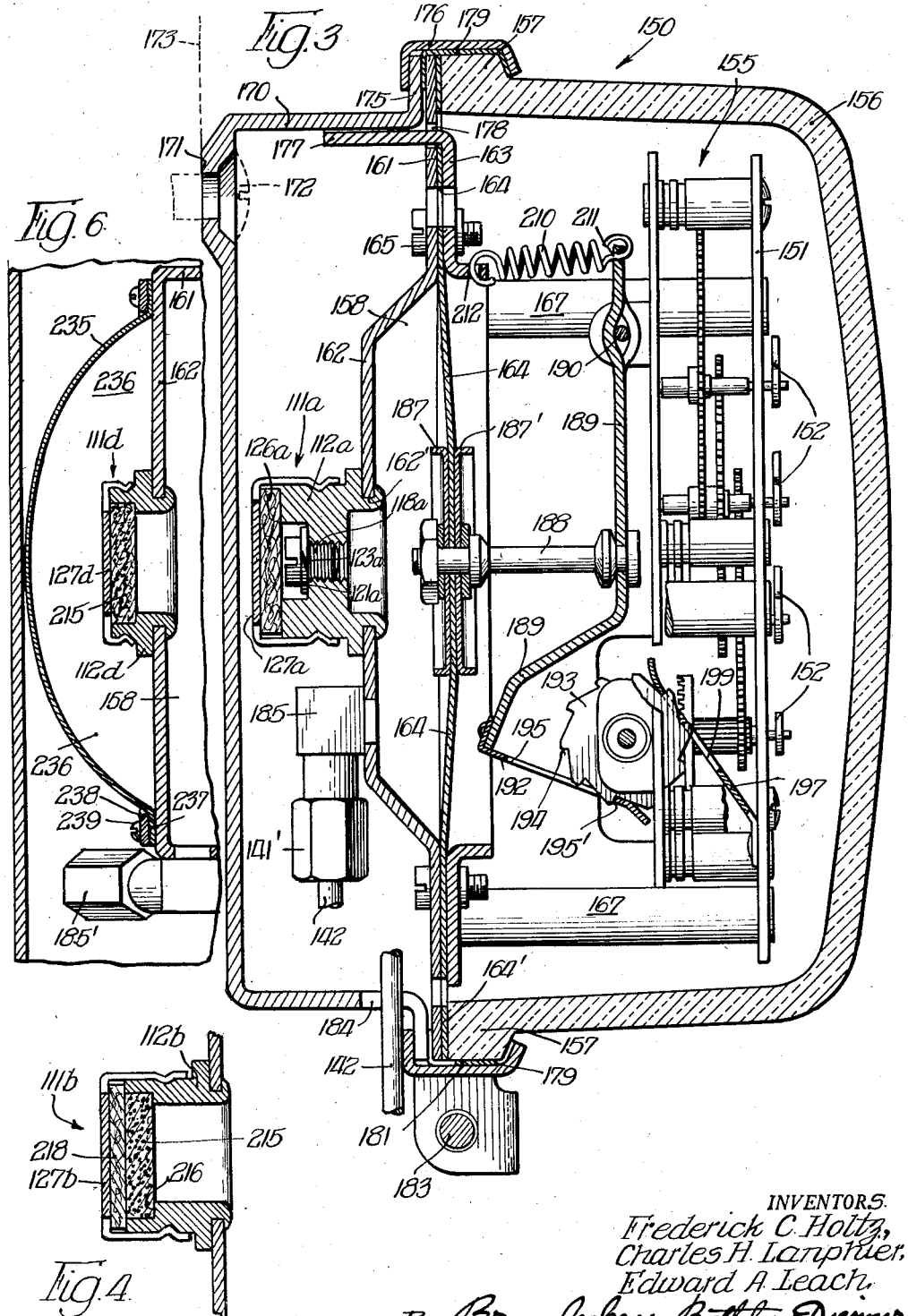

United States Patent Office 2,858,983
Patented Nov. 4, 1958

2,858,983

TELEMETER REGISTER FOR METERS

Frederick C. Holtz, Charles H. Lanphier, and Edward A. Leach, Springfield, Ill., assignors to Sangamo Electric Company, Springfield, Ill., a corporation of Illinois Application September 30, 1954, Serial No. 459,446

4 Claims. (Cl. 235—91)

The present invention relates to improvements in telemeter registers for gas or other types of meters.

The invention has particular application to gas meters and other domestic meters which are customarily located in the basements of residences, or otherwise located indoors of the building being served by the meter. This indoor location is desirable or essential in localities subject to wide temperature changes or freezing weather, where it is not practicable to locate a gas meter or a water meter in an outdoor location.

The indoor location of such meters has long presented meter reading problems of real magnitude to the public utility companies, particularly because of the frequent occasions when the meter reader is unable to obtain access to the meter, owing to the fact that there is no one at home. There has been long-felt want for a satisfactory remote indicating register which will enable the meter reader to make a meter reading at a point outside of the house or building, and several types and constructions of remote indicating registers have been heretofore proposed. The requirements of a satisfactory design of remote indicating register are rather exacting, however, and these prior devices with which we are familiar have not been entirely satisfactory for one reason or another. For example, the device must have a high degree of accuracy and reliability of performance; it should not require servicing; it should not be dependent upon an electric light or power circuit for a source of operating energy; it should have a high degree of safety, particularly for use with gas meters; and its construction should be sufficiently simple and inexpensive that the cost of the device and its installation does not more than offset the cost of repeated visits of a meter reader to a residence for obtaining access to the meter.

Our improved apparatus herein disclosed operates upon the fluid impulse transmission principle, wherein the indoor meter and the outdoor indicator are connected by a small conduit through which fluid impulses are transmitted from the meter to the indicator. This general type of apparatus is disclosed in Reissue Patent 23,800, reissued March 16, 1954, to Raymond J. Dufour, on "Remote Meter Registration Device," and is also disclosed in the copending application of Earl Greenwood, Frederick C. Holtz and Elmer C. Meinders, Serial No. 407,-834, filed February 3, 1954, on "Remote Indicating Register for Meters." Our invention herein disclosed embodies improved features and modifications of the general type of apparatus disclosed in this Dufour patent and in this Greenwood, Holtz and Meinders application.

In the apparatus disclosed in the Dufour reissue patent a fluid pulse transmitter is embodied directly in the gallery chamber of the gas meter and is arranged to be driven from the gas measuring bellows of the meter at a rate proportional to the rate of gas flow through the meter. The Dufour pulse transmitter is in the form of a cylinder having a reciprocating piston which is reciprocated in one direction at a relatively slow rate while storing energy in a return spring. At the end of this slow energy storing stroke, the piston is tripped or suddenly released so that the energy stored in the return spring causes a relatively quick return stroke of the piston. It is this quick spring-impelled return stroke of the piston that is utilized to create the fluid pulse which is transmitted through the telemetering system to the outdoor indicator, the frequency of these pulses being proportional to the rate of gas flow through the meter. These fluid pulses are conducted from the pulse transmitter in the meter through a small flexible conduit which extends to the pulse receiver in the outdoor indicator, this pulse receiver consisting of a diaphragm chamber having a diaphragm which flexes in response to the pulses and transmits stepping strokes to the counting wheels of the outdoor indicator. The Dufour apparatus utilizes the illuminating gas itself as the pulse transmitting fluid in the system. In this apparatus there is a valve in the closed end of the cylinder which is arranged to be opened by the piston in its slow, energy-storing stroke so as to admit gas from the gallery chamber into the cylinder, whereby the valve functions as a charging valve to charge or establish the proper pressure condition in the pulse transmitting system. This so-called charging valve is then automatically closed so that the piston will be operative during its quick spring impelled return stroke to create an effective pulse in the confined column of gas leading to the outdoor indicator.

In the apparatus disclosed in the Greenwood, Holtz and Meinders application the pulse transmitter is in the form of a diaphragm chamber in which the fluid pulses are created by a diaphragm having a slow energy storing stroke in one direction, and a quick spring-impelled stroke in the other direction. This copending application discloses one system utilizing the illuminating gas as the pulse transmitting medium, and discloses another system employing atmospheric air as the pulse transmitting medium, each system having a so-called charging valve for admitting the gas or air to the diaphragm chamber.

One of the objects of the present invention herein disclosed is to provide a system which is more simplified and has fewer moving parts than the systems described above. More specifically, our new system dispenses with the so-called charging valve which is embodied in the transmitter in each of the earlier systems to maintain the proper pressure conditions in the pulse transmitting system. The elimination of this charging valve reduces the cost of manufacturing and assembling the device, which is an important factor where relatively expensive equipment would not justify the installation. Furthermore, the elimination of the charging valve reduces the number of moving parts in the system, and hence increases the reliability of the apparatus. In each of the above described earlier systems, the effective working of the charging valve is practically essential to the successful operation of the system. If the valve should stick in the open position or should leak badly, the system is likely to fail because the quick spring-returned stroke of the piston or diaphragm would not be able to create sufficient pressure differential to make an effective fluid pulse. Conversely, if the valve should fail to open properly, this may result in a pressure condition in the system which would be abnormal in the sense that it would not transmit an effective pulse, or would permit false registration at the outdoor indicator because of rapid changes of atmospheric pressure.

We have avoided these potential troubles by employing an improved fluid leak or bleeder orifice in lieu of the charging valve. This is made feasible because of the very slow motion of the piston or diaphragm in the energy storing direction of movement, and its relatively rapid motion in the energy releasing direction. During the slow motion, this leak or bleeder orifice permits sufficient seepage of fluid therethrough to establish the proper pressure condition in the system. During the relatively rapid motion the bleeder leak cannot satisfy the pressure differential, and hence a fluid pulse is created. Such bleeder leak mode of operation enables the system to be readily adapted to the use of either illuminating gas or atmospheric air as the pulse transmitting medium. For example, the bleeder leak can be located in the gas meter when it is desired to use gas as the pulse transmitting medium, or it can be located at the outside indicator when it is desired to use air as the pulse transmitting medium. Also, bleeder leaks may be provided at both locations, whereby gas entering the pulsing system through the gas leak located at the gas meter will serve as a purge for eliminating moisture taken into the system through the atmospheric air leak located at the outdoor indicator. As a still further development of our invention, we also contemplate a construction in which an atmospheric air leak for the system would be located indoors at the gas meter, which location may be desirable to reduce or avoid the entrance of moisture, dirt, corrosive gases, etc. into the pulsing system.

In this regard, another object of our invention is to provide improved screening or filtering means associated with the leakage orifice for minimizing the entrance of moisture, corrosive gases, dirt, etc. in systems having an air orifice opening to atmosphere, or a gas orifice opening into the gallery chamber of the meter, or having both types of orifices.

A still further object of the invention in this same regard is to provide a modified system employing such leak or bleeder orifice, but in which the entire system is hermetically sealed. That is to say, the leak or orifice has no external communication with the atmosphere or with gas in the gallery chamber. Instead, it opens into an expansion and contraction chamber which accommodates very slight changes of pressure, but only at the relatively slow rate imposed by the restriction of the leak or orifice. For example, this variable volume chamber may comprise a thin impermeable membrane, composed of silicone rubber or the like, which will accommodate rapid changes of atmospheric pressure or other pressure conditions which might otherwise disturb the accurate operation of the telemetering system.

Other objects, features and advantages of the invention will be apparent from the following detail description of certain preferred embodiments. In the accompanying drawings illustrating such embodiments we have shown the same general type of pulse transmitter and pulse receiver as are disclosed in the aforementioned copending application of Greenwood, Holtz and Meinders, Serial No. 407,834, to which reference may be made for particular details of such apparatus. In the accompanying drawings:

Figure 1 is a top or plan view of a conventional gas meter showing the pulse transmitter mounted in the gallery chamber and provided with a gas type of leak or bleeder; and Figure 1A diagrammatically illustrates the external pulse transmitting conduit leading from the pulse transmitter to the indicating register on the outside of the building;

Figure 2 is a vertical sectional view through the pulse transmitter and its leak or bleeder orifice, taken on the plane of the line 2—2 of Figure 1;

Figure 3 is a vertical or diametrical sectional view of the outdoor indicating register, showing the pulse receiver therein provided with an atmospheric air type of leak or bleeder;

Figure 4 is a fragmentary sectional view of a modified construction of leak or bleeder, which may be used as a gas leak at the transmitter, or as an air leak either at the receiver or at the transmitter;

Figure 5 is a fragmentary sectional view through the pulse transmitter in the gallery chamber of the meter, showing a modified arrangement enabling an atmospheric air leak to be connected to said transmitter; and Figure 6 is a fragmentary sectional view of the modified construction employing an expansion and contraction chamber in association with the leak for obtaining a hermetically sealed system.

We have shown our telemeter registering apparatus as used with a gas meter 10 (Figure 1) of any conventional type, typically illustrated by a Glover tin type of meter. Such a meter usually has a box-like casing 11 provided with gas inlet and outlet conduit connections 12 and 13 communicating with the measuring mechanism enclosed within the box-like casing. As shown in Figure 2, the gas meter comprises a removable top 14 which is usually soldered, or otherwise secured to the casing body to provide an enclosed upper space 15 defined within the side walls 15'. This enclosed upper space 15 is separated from the measuring bellows (not shown) by a horizontal separating wall or partition 16. Such upper deck area 15 is frequently referred to as the gallery chamber, and the partition 16 as the gallery table. This type of meter is usually provided with an inlet channel 17 extending from the gas inlet conduit 12 to the measuring bellows, such inlet channel lying partly or entirely above the level of the gallery table. The measuring bellows of the meter are operatively connected to oscillate a pair of vertical shafts or flag rods 18 and 19 passing upwardly through the gallery table 16 into the gallery chamber 15. Through the operation of conventional well known apparatus, the movement of the measuring bellows, in response to the flow of gas from the supply pipe 12 to the service pipe 13, causes these two flag shafts 18 and 19 to be oscillated back and forth at rates proportional to the rate of gas flow. Mounted on the upper ends of the flag shafts 18 and 19 to oscillate therewith are flag arms 21 and 22 which have their oscillating ends pivotally connected at 21' and 22' with links 23 and 24. These links have their other ends pivotally connected to a wrist pin 25 extending upwardly from a revolving crank 26. This crank 26 is mounted on the upper end of a vertical shaft 27, and the operating relation is such that the back and forth oscillations of the flag rods 18 and 19 impart a uni-directional rotation to the vertical shaft 27. The lower end of shaft 27 has support in a bearing mounted on the gallery table 16, and the upper portion of the shaft has bearing support just below the tangent wrist arm 26 in an angular bracket 28 extending upwardly from the gallery table. Mounted on the lower portion of this vertical shaft 27 is the conventional crank mechanism operating the conventional slide valves 29 governing the gas flow through the bellows. Mounted on the upper portion of the vertical shaft 27 is the conventional worm 30 which meshes with a worm wheel 31 mounted on a forwardly extending horizontal shaft 32, commonly referred to as the proving circle axle. The rear end of this proving circle shaft is journalled in a bearing bracket 33, and the front end of said shaft is operatively connected with the main indicating index or register 34 generally mounted in the front wall of the meter housing. All of the foregoing constitutes conventional well-known construction in the gas meter art. Our remote indicating register is arranged to derive operating energy from the above described mechanism of the gas meter, preferably through a gear drive which meshes with and is driven by the worm wheel 31. Our pulse transmitting unit, designated 40 in its entirety, is mounted within the gallery space 15 and is secured to the gallery table 16 and also to the side wall 15'. When such transmitter unit is to be installed in a previously built meter which has been returned to the public utility company shop for such installation, the meter top 14 is, of course, first removed, and then the flag arm links 23 and 24 are disconnected from the wrist pin 25 and swung out the way to permit the transmitter unit 40 to be mounted on the gallery deck 16 with its gear system meshing with the proving axle gear 31, as will be later described. Following such mounting of the transmitter unit on the gallery deck 16, the flag arm links 23 and 24 are reconnected to the wrist pin 25.

Referring now to Figure 2, the transmitter unit 40 comprises a vertical frame plate or bracket 41 having an angularly bent supporting foot 42 adapted to be secured to the top of the gallery deck 16, and another foot 42′ adapted to engage the deck. In addition, a supporting wire 43 carried by the unit is adapted to have its ends soldered to the meter, as shown in Figure 1. Rotatably supported in the transmitter unit assembly 40 is a horizontally extending shaft 44 carrying a gear 45 which meshes with the worm wheel 31 to be driven thereby. The rear end of the shaft 44 is journaled in a bearing 44a in the vertical supporting plate 41, and the front end of said shaft is journaled in a bearing 44b carried by an extension of the diaphragm housing cover (Figure 1), as will be later described. Driven through the gear 45 is a train of reduction gearing comprising a pinion 47 mounted on the rear end of the shaft 44 and meshing with a large gear 48 which is pivotally mounted on a stub shaft 49 projecting forwardly from the frame plate 41. Rotating with the large gear 48 is a pinion 51 which drives a large gear 52 rotatably mounted on another stub shaft 53 projecting forwardly from the vertical frame plate 41, the latter gear 52 being shown as having a shrouding flange 52′ on its front side. This large gear 52 carries a large spiral cam 55 on its front face, this cam preferably being formed integral with the gear 52. Said cam has an inner point of minimum radius 56 from which the cam spirals outwardly to a point of maximum radius 57, these two points of minimum and maximum radius being joined by a substantially radial drop-off shoulder 58. The cam has a clockwise direction of rotation, as indicated by the arrow in Figure 2, and responding thereto is a cam follower roller 61 carried by a diaphragm actuator 62.

The upper end of this diaphragm actuator 62 is suitably secured, as by a screw 63, to a diaphragm 64 operating in a horizontally disposed pulse transmitting chamber 65. This diaphragm actuator 62 is an inverted U-shaped stamping having spaced side walls 62′, 62′ between the lower ends of which is mounted the cam follower roller 61. The movement of the diaphragm actuator 62 is guided by a parallel link system comprising upper and lower parallel links 67 and 68. The swinging ends of these links have pivotal connection with the diaphragm actuator through upper and lower pivots 71 and 72, and the opposite ends of said links have mounting on stationary pivot axes 73 and 74 carried by the supporting frame 41. The upper link 67 has U-shaped notches 75 and 76 extending upwardly down over the swinging and stationary pivots 71 and 73 of this link. A relatively heavy tension spring 77 has a hook-shaped upper end 78 which is hooked through an aperture 79 in this upper link 67, the lower end of said spring having a hook 81 which is engaged under a lug 82 projecting laterally from the supporting frame plate 41. This tension spring holds the follower roller 61 pressed downwardly against the periphery of the cam 55, and causes a relatively abrupt downward movement of the diaphragm actuator and diaphragm when the follower roller 61 rides off the drop-off shoulder 58 of the cam. In addition, this spring 77 holds the notches 75 and 76 engaging down over the pivots 71 and 73. The lower swinging link 68 has its swinging end bent laterally to pass through apertures in the actuator side arms 62′ and through the cam follower roller 61, whereby this laterally bent end of the link constitutes the pivot 72 for the roller 61. The opposite end of said lower link 68 is also bent laterally to form the pintle portion 74 which extends through aligned apertures formed in the frame plate 41 and in a laterally spaced downwardly extending arm 85 formed integrally with the frame plate. For more specific details as to the mounting of the parallel links 67 and 68 and their connection with the actuator 62, attention is directed to the aforesaid copending application, Serial No. 407,834.

Referring now to the diaphragm chamber 65, this comprises a chamber cover 101 formed with a peripheral clamping flange 102 which cooperates with a lower clamping ring 103 between which the peripheral portion of the diaphragm 64 is clamped by the screws 104a, 104b. The lower clamping ring 103 of the diaphragm chamber is open at its center to permit the diaphragm to flex downwardly therethrough. The diaphragm chamber has fixed mounting on the upper portion of the frame plate at a plurality of points, such as represented by the screws 104a, 104b. The central portion of the diaphragm 64, which is preferably composed of rubber, neoprene or the like, over a base fabric of Orlon or nylon, is reinforced by upper and lower sheet metal backing disks 107, 108. The attaching screw 63 which joins the actuator 62 to the diaphragm, threads into a tapped hole in the upper portion of the actuating yoke 62. As pointed out in the aforesaid copending application, the horizontal disposal of the diaphragm chamber permits the use of a relatively large diaphragm, which is advantageous for obtaining a distinct operating pulse, while still keeping the over-all height of the transmitter unit 40 to a minimum, so that it can be readily installed beneath the operating plane of the flag arms and links of the conventional meter. It will be seen from the description thus far that the cam 55 is rotated by the gas measuring bellows at a rate dependent upon the rate of gas flow through the meter. The long spiral slope of this cam results in a relatively slow upward flexure of the diaphragm 64, during which upper flexure energy is being stored in the tension spring 77. As illustrative of one typical operating relation, the cam may be arranged to rotate one revolution for each 100 cubic feet of gas passing through the meter. In the case of a home installation, with the family away on a summer vacation, and only one or two pilot lights consuming gas, this would mean that the diaphragm might require several days to complete this slow outward flexure. As soon as the radial drop-off shoulder 58 moves into the dotted line position illustrated in Figure 2, the cam follower roller 61 is immediately pulled downwardly with a relatively abrupt movement by the tension spring 77, thus causing the quick downward flexure of the diaphragm 64 for effecting a sharp pressure reduction in the diaphragm chamber and thereby transmitting a rarefaction pulse to the bellows chamber of the outdoor indicating unit, as will be later described.

Referring now to our improved means for controlling or regulating the normal pressure which prevails in the diaphragm chamber 65, between the creation of these rarefaction pulses, we have shown the transmitter unit 40 of Figure 2 as being provided with a leak or bleed orifice which establishes communication between the gallery chamber 15 and the interior of the diaphragm chamber 65. This pressure regulating leak is designated 111 in its entirety, and comprises a cylindrical body 112 having fixed attachment in a central aperture 113 provided in the diaphragm chamber cover 101. This fixed attachment may comprise an upper flange 114 seating on the outer surface of the diaphragm chamber cover, and a lower bead or flange 115 riveted or spun over on the under side of the cover. A cavity 116 extends upwardly in the body 112 to accommodate the head of the diaphragm screw 63, and extending upwardly from this cavity is a threaded bore 117 into which screws the shank of the cap screw 118. The upper end of the threaded bore opens into a counterbore 119 in which seats a split type of lock washer 121 held down against the bottom of the counterbore by the head 122 of the screw. The split 123 in the lock washer serves to establish a leak passageway between the counterbore 119 and the threads of the threaded bore 117. Extending over the counterbore 119, and seating on a flat outer surface 125 of the body 112 is a disk or plug 126 of porous material. For example, this disk might be composed of felt, ceramic material, sintered metal or other suitable material capable of performing a filtering function to prevent or minimize the passage of dirt particles, moisture, etc. This porous disk 126 is held in place on the flat surface 125 by a spring retaining cap 127 in the form of a sheet metal disk having a plurality of angularly spaced spring fingers 128 extending downwardly at three or four points around the disk. The lower portions of these fingers are formed with inwardly extending humps 129 adapted to engage in an annular groove 131 formed around the outside of the body portion 112. Thus, the cap 127 can be readily snapped into and out of position for inspecting or replacing the porous disk and other parts. In order that a relatively large area of the porous disk 126 be exposed for the passage of gas therethrough, the disk portion of the retainer cap is made smaller than the diameter of the mounting body and of the porous disk. The parts are so constructed and proportioned that the constricted passage through the threaded bore 117, lock washer slot 123 and filter disk 126 imposes the proper restriction to flow which will prevent any susbtantial portion of the abrupt rarefaction pulse being dissipated through this leakage path, but which will nevertheless permit substantial flow between the gallery chamber 15 and the interior of the diaphragm chamber during the relatively slow upward flexure of the diaphragm in its energy storing stroke. Hence, during this upward energy storing stroke of the diaphragm, and particularly at the upper end of this stroke, the pressure prevailing in the diaphragm chamber will be substantially the pressure of the gas prevailing in the gallery chamber 15, which is practically always above atmospheric pressure. There is usually enough leakage of gas from the measuring bellows upwardly around the flag rods 18, 19 and other moving parts to insure a pressure of gas in the gallery chamber 15 practically equal to the supply pressure on the gas supply line. However, if this leakage into the gallery chamber 15 should not be adequate, a small hole 139 can be drilled through the gallery table into one of the bellows or diaphragm compartments below the gallery table.

Referring now to the connection for transmitting the abrupt rarefaction pulses from the transmitter 40 to the outdoor indicating unit, it will be seen that a coiled length of ductile tubing 135, such as copper tubing, extends from the diaphragm chamber, at a point above the diaphragm, and connects to a compression fitting 136 which is mounted in a hole 137 in the side wall 15' of the gallery chamber 15. A flange 138 on the inner portion of the compression fitting 136 is soldered to the inside of the meter wall. A compression nut 141 and internal sleeve establish coupling engagement over the compression fitting 136 and connect with the length of pulse transmitting tubing 142 which extends to the outdoor indicator.

This outdoor indicator, illustrated in Figure 3, and designated 150 in its entirety, is adapted to be located at any suitable point on the outside of the house or building, where it will be of convenient access to the meter reader, but as close as practicable to the inside meter 10. As shown in Figure 1A, this outdoor receiver or indicator comprises a main dial plate 151 on which are mounted a series of totalizing indicating pointers 152 cooperating with numbered dials 153 designating hundreds, thousands, ten thousands and hundred thousands cubic feet of gas, corresponding to the same readings appearing on the main indicating register or index of the inside gas meter 10. Referring to Figure 3, which shows this outdoor unit in enlarged section, the dial plate 151 and totalizing pointers 152 constitute part of a mechanism unit 155 which includes the diaphragm chamber, diaphragm, stepping ratchet, ratchet wheel, carry-over gearing between the indicating pointers, etc. This mechanism unit 155 is closed on the front side by the glass cover 156 having a seating rim or flange 157 at its rear edge. The diaphragm chamber 158 which receives the fluid stepping pulses from the transmitter unit 40 through conduit 142, comprises a circular rear plate 161 having a rearwardly dished central portion 162. Cooperating with this rear plate 161 is a front plate or clamping ring 163, and between these two members 161 and 163 is clamped the diaphragm 164, preferably composed of rubber, neoprene or the like over a base fabric of Orlon or nylon. The rear plate 161 and the front clamping rim 163 are fastened together by a plurality of cap screws 165 passing through the rear plate and threading into tapped bosses punched forwardly from the clamping rim 163. Spacer posts 167 have their front ends riveted to the dial plate 151 and have their rear ends secured to the diaphragm housing assembly 161, 163 by cap screws or the like, whereby the diaphragm assembly functions as a supporting frame plate for mounting the mechanism of the mechanism unit 155.

This outdoor indicating unit 150 is adapted to be mounted on the outside of the house or building through the medium of a mounting cup 170 provided with a plurality of internal apertures 171 for receiving inside screws, bolts or the like 172 extending into the supporting wall 173 of the house or building. When the receiver unit is assembled on this mounting cup 170, the fastening screws or bolts 172 are inaccessible to unauthorized access. The mounting cup 170 has an outwardly extending front flange 175 against which the mechanism unit and the cover glass are adapted to be held by a clamping band 176. The proper centering of the diaphragm chamber assembly 161, 163 with respect to this mounting cup is assured by providing guide tongues 177 at angularly spaced points around the periphery of the clamping rim 163, which guide lugs are projected rearwardly through openings 178 in the diaphragm housing plate 161, so that these lugs function as centering guides in entering the cup 170. The clamping flange 157 of the glass cover 156 is adapted to be clamped to the outer side of the diaphragm housing plate 161 by an inner clamping or sealing band 179 which embraces the forward surface of the flange 157 and the rear edge of the plate 161. The two ends of this inner sealing band 179 are adapted to be connected by a thin metallic sealing strap 181, the latter adapted to have one end inserted outwardly through a slot in one end of the sealing band and then bent over. The other end of this sealing strap is adapted to be similarly passed outwardly through a slot in the other end of the sealing band 179 and then bent over. This sealing strap 181 enables the two ends of the sealing band 179 to be drawn toward each other for obtaining a snug fit of the band 179, before the ends of the strap 181 are bent over to hold the band 179 in place. The peripheral portion of the diaphragm 164 is extended outwardly to function as a cushioning gasket 164' between the rear surface of the glass cover and the forward surface of the metal frame plate 161. After the mounting cup 170 has been stationarily secured to the supporting surface 173, and after the pulse transmitting conduit 142 has been connected to the diaphragm chamber 158, the subassembly comprising the mechanism unit 155 and the glass cover 156 (joined together by the inner sealing band 179) is mounted on the mounting cup 170 and is secured thereto by the outer sealing band 176. This outer sealing band embraces the front surface of the inner sealing band 179 and embraces the back surface of the mounting cup flange 175. The two ends of this outer sealing band 176 are adapted to be drawn together by any conventional form of removable sealing screw 183, preferably of the type accommodating the lead seal of the utility company, or padlock, or other tamperproof sealing instrumentality.

The length of pulse transmitting copper tubing 142 enters the mounting cup 170 through a slot 184 located at any convenient point in the wall of the cup. The tubing is preferably given a complete or partial loop within the mounting cup, for the purpose of flexibility, before having its end connected with the interior of the diaphragm chamber 158. This connection is shown as being established through a coupling 185 and compression nut 141' and internal sleeve, similarly to the connection employed at the transmitter end of the tubing.

The diaphragm 164 carries inner and outer diaphragm cups or disks 187, 187' which mount an actuating stem or spindle 188. The latter stem or spindle passes through an aperture formed at an intermediate point in an advancing lever 189 which has one end pivoted on a stationary pivot pin 190 carried by the mechanism unit. The other end of this stepping lever 189 has a flexible reed type of advancing pawl 192 which is riveted or otherwise secured thereto. This advancing pawl may consist of a very thin strip of beryllium copper or the like, which is spring tempered to have flexing engagement over the teeth of a ratchet wheel 193. This spring strip has a rectangular opening 195 formed therein which embraces the adjacent periphery of the ratchet wheel 193. The far edge 195' of this rectangular opening is adapted to have step-by-step ratcheting engagement with the right angle shoulders 194 of the ratchet wheel teeth. Thus, with the transmission of each rarefaction pulse from the transmitting unit 40 to the diaphragm chamber 158, the resulting inward flexure of the diaphragm 164, operates through lever 189 and advancing pawl 192 to transmit a one-step advancement to the ratchet wheel 193. This ratchet wheel is connected with the rotating indexing arrows of the indicator dials through any conventional form of gearing. The ratchet wheel 193 is held against reverse rotation, during the retracting movement of the advancing pawl 192, by a holding pawl 197 which is also of this same flexible reed type. That is to say, this holding pawl similarly comprises a thin strip of spring tempered beryllium copper or the like having one end anchored to the mechanism unit and having a rectangular slot 199 in its outer end embracing the ratchet wheel, the far end of this rectangular opening cooperating with the ratchet wheel teeth to prevent reverse rotation of the ratchet wheel.

It will be understood that atmospheric pressure prevails on the inner side of the glass cover 156 of this outdoor indicating unit 150, and is effective on the outer or right hand surface of the diaphragm 164. The pressure which normally prevails within the diaphragm chamber 158, on the inner side of the diaphragm 164, is substantially the same pressure that normally prevails within the diaphragm chamber 65 of the transmitter unit 40, there being a relatively small drop of pressure in the connecting tube 142. If it is desired that the pulse transmitting medium filling the entire pulse transmitting system shall consist solely of illuminating gas bled into the pulse transmitting system from the gallery chamber 15 through the leak device 111, then the diaphragm chamber 158 of the outdoor indicating unit will have no leak communication with atmosphere. In such case, the entire outdoor indicating unit might consist of the same identical outdoor unit disclosed in the aforesaid Greenwood, Holtz and Meinders copending application, Serial No. 407,834. In such embodiment, the superatmospheric pressure of the illuminating gas transmitted from the transmitter unit to the diaphragm chamber 158 of the outdoor indicator will maintain the diaphragm 164 flexed outwardly substantially to the position illustrated, during the normal pressure interval between pulses. Upon the occurrence of the rarefaction pulse, resulting from the abrupt downward movement of the transmitter diaphragm, the outdoor indicator diaphragm 164 will be drawn to the left because of the differential between atmospheric pressure and the sub-atmospheric pressure of the pulse, for the transmission of one stepping actuation to the totalizing counters.

As previously described, our invention also contemplates modified embodiments wherein the pulse transmitting system has a leak or bleed communication with atmosphere. In one modified embodiment, this atmospheric leak may be used to operate in conjunction with, or to supplement the illuminating gas leak 111, shown in Figure 2. In another modified embodiment, this atmospheric leak may be employed to the exclusion of the illuminating gas leak, so that the pulse transmitting medium is composed solely of atmospheric air. One such arrangement of atmospheric leak is shown in Figure 3 as being built into the outdoor indicating unit 150, so as to establish communication between atmosphere and the diaphragm chamber 158 of this outdoor unit. This atmospheric leak, designated 111a in its entirety, is substantially identical with the previously described leak unit 111. This atmospheric leak unit 111a is mounted in a central aperture 162' formed in the rearwardly dished central portion 162 of the rear diaphragm chamber plate 161. The parts of this atmospheric leak are the same as the parts of the gas leak 111, and have been given the same reference characters with the suffix a appended thereto. This amospheric leak 111a establishes communication between atmosphere and the interior of the diaphragm chamber 158 in the same manner and substantially to the same extent that the gas leak 111 establishes communication between the gallery chamber 15 and the transmitter diaphragm chamber 65. In such embodiment using an illuminating gas leak 111 at the transmitter unit, and using an atmospheric air leak 111a at the receiver unit, the gas leakage which occurs from the gallery chamber 15 into the pulse transmitting system is then available to serve as a purge and eliminate moisture which might be taken into the system through the atmospheric air leak 111a at the receiver unit. In such embodiment, if the amount of gas leaking from the measuring bellows into the gallery chamber 15 should greatly diminish, or if there should be no leakage of gas into this gallery chamber, the atmospheric air leak 111a at the receiver unit will serve to prevent false registration of the outdoor indicator due to the rapid changes of atmospheric pressure.

As previously described, we also contemplate a modified embodiment of the system wherein the pulse transmitting medium is composed solely of atmospheric air which is introduced into the system at the pulse receiving diaphragm chamber 158 through the atmospheric air leak 111a. In such embodiment, the gas leak 111 communicating between the gallery chamber 15 and transmitter diaphragm chamber 65 is dispensed with entirely, so that this transmitter diaphragm chamber is closed against the admission of gas from the gallery chamber 15, and the only fluid entering the system consists of atmospheric air entering through the air leak 111a at the outdoor indicating unit.

In certain embodiments or under certain operating conditions it may be desirable to place a light spring bias on the diaphragm 164 of the outdoor receiving unit, tending to bias the diaphragm outwardly into its normal position. The purpose of this spring bias is to insure that the diaphragm will move outwardly to its fully retracted outward position upon the cessation of the rarefaction pulse. As illustrated in the upper portion of Figure 3, this spring bias may be obtained by the use of a light tension spring 210 connected to the upper end of the advancing lever 189 projecting upwardly beyond its mounting pivot 190. One end of this tension spring 210 is hooked into an aperture 211 in this end of the advancing lever 189, and the other end of said tension spring is hooked into an aperture 212 formed in the inner rim of the clamping plate 163. This tension spring 210 insures that the diaphragm 164 will be flexed outwardly to its normal outer position immediately upon cessation of the rarefaction pulse being transmitted from the transmitter unit, such spring bias possibly being desirable more frequently in systems using atmospheric air as the pulse transmitting medium, or in systems where the pressure of the gas in the supply line is relatively low.

In Figure 4, we have illustrated a modified embodiment of leak device, designated 111b in its entirety. This modified embodiment follows the previously described embodiments 111 and 111a in general structure, except that it omits the screw 118, 118a and lock washer 121, 121a, and substitutes in lieu thereof a porous disk 215 composed of ceramic material, sintered metal or the like. This porous disk 215 is seated in a counterbore 216 formed in the body portion 112b, and may be cemented into position in this counterbore to reduce leakage around the edges of the porous disk. We also contemplate the use of a felt disk 218 extending over the outer surface of the porous disk 215, such felt disk serving to entrap relatively large particles of foreign material and prevent their accumulation on the outer surface of the filter disk 215. The felt disk 218 may be held in place by the same type of releasable retainer cap 127b, previously described. This modified construction of leak or bleeder unit 111b may be employed in lieu of the gas leak unit 111 at the transmitter, or in lieu of the atmospheric air leak 111a at the receiver.

In Figure 5 we have illustrated another modified embodiment in which the pulse transmitting medium consists solely of atmospheric air, but wherein this air is introduced into the system at the transmitter end rather than at the receiver end. In this embodiment, we mount on the diaphragm housing cover 101 a leak or bleeder device which may take the form shown at 111 and 111a, or which may take the form shown at 111b. However, instead of having this leak device exposed to the gas prevailing in the gallery chamber 15, we completely enclose the outer side of this leak device by a cup-shaped closure cap 225. The lower edge of this cup-shaped enclosure 225 is soldered to the top of the diaphragm housing cover 101 at 226, so as to establish a leak chamber 227 which hermetically seals the leak device 111 and the diaphragm chamber 65 from the gas prevailing in the gallery chamber 15. Extending from the closure cup 225 at any suitable point is a conduit or section of tubing 228 leading to any suitable point of connection with the atmosphere exterior of the gas meter. For example, this section of atmospheric venting tubing 228 may be connected with a coupling or fitting 229 which is soldered in an opening in one of the side walls 15' of the gallery chamber. This section of tubing 228 with its fitting 229 establishes an atmospheric passageway 230 leading into the leak chamber 227, so that atmospheric pressure prevails at all times in this leak chamber 227. Thus, the pulsing system is charged solely with atmospheric air through this leak device located at the transmitter end of the system.

In Figure 6 we have illustrated still another modified embodiment of our invention which employs a leak or bleeder orifice, but in which the entire system is hermetically sealed, i. e. the leak or bleeder orifice has no external communication either with the atmosphere or with gas in the gallery chamber 15. Instead, it opens into an expansion and contraction chamber which accommodates very slight changes of pressure, but only at the relatively slow rate imposed by the leak or orifice. This leak or orifice, designated 111d, is preferably located at the receiver unit, being mounted in the back wall 161 of the diaphragm chamber 158, as described of Figure 3. In such embodiment, it is necessary that the leak device 111d be provided with a flow restricting orifice such as is established by the screw 118 and lock washer 121, or by the porous disk 215, but the felt filtering washer or disk may be dispensed with, if desired. Extending over this leak device 111d is a thin impermeable membrane 235 which is arranged to establish an expansible and contractible breather chamber 236 enveloping the outer portion of the leak device 111d. This membrane 235 may be composed of silicone rubber, or other flexible material, impermeable to air. The member is shown of elongated hemispherical form and has its peripheral edge 237 secured to the outer surface of the rear diaphragm wall 161 by a retaining ring 238 secured to the diaphragm wall by screws 239. The diaphragm chamber 158 is connected with the pulse conducting tube 142 through a coupling 185' which connects with an edge portion of the rear diaphragm housing plate 161. This variable volume chamber 236 defined by the thin imperable membrane 235 will accommodate rapid changes of atmospheric pressure, or other pressure conditions which might otherwise disturb the accurate operation of the telemetering system.

The use of air as the pulse transmitting medium has certain advantages, and similarly the use of gas as the pulse transmitting medium has certain other advantages. For example, for facility of installation, the preferred form of conduit extending from the meter to the outside indicator is flexible tubing, such as copper tubing, which is more susceptible to mechanical injury than the iron or steel pipe which usually conducts the gas to or from the meter itself. Such mechanical injury to copper tubing may arise from falling objects, or from being struck by indoor trucks, moving doors, or from other accidental causes. Hence, there may be objections in some situations to conducting the combustible gas from the indoor gas meter to an outdoor indicator through a length of this copper tubing or like flexible conduit, which objections are avoided by the use of air as the pulse transmitting medium. Furthermore, by using air as the pulse transmitting medium, the apparatus can be employed on water meters and other meters where gas is not available. On the other hand, when air is used as the pulse transmitting medium in the earlier systems under discussion, the introduction of atmospheric air directly into the transmitter and receiver chambers and interconnecting tubing may result in entrained moisture, dirt, corrosive gases, etc. entering the telemetering system, with possible deleterious effects after substantial periods of operation. For example, a substantial accumulation of moisture in the diaphragm chamber of the outdoor indicator, or in exposed portions of the interconnecting tubing, may freeze in cold weather and disturb the operation of the apparatus. Similarly, accumulations of dirt over a long period of time, particularly in the interconnecting tubing, may plug up the system. It will be seen from the foregoing description that we can readily adapt our improved telemeter registering apparatus either to the use of gas or to the use of air as the pulse transmitting medium, depending upon the desire of the meter customer, or upon the requirements of particular types of installations. It will also be seen that in each of these adaptations using either air or gas as the pulse transmitting medium, we effectively avoid the entrance of moisture, dirt, corrosive gases, etc. into the pulse transmitting system.

While we have illustrated and described what we regard to be the preferred embodiments of the invention, nevertheless it will be understood that such are merely exemplary and that numerous modifications and rearrangements may be made therein without departing from the essence of the invention.

We claim:

1. In a telemeter register for a gas meter, the combination of an indicating register adapted to be located relatively remotely from the meter to which it is to respond, a fluid pulse transmitting system between said register and said meter including a fluid pulse transmitter located at the meter and arranged to be actuated thereby for generating rarefaction pulses of sub-atmospheric pressure, a fluid pulse receiver located at said indicating register and arranged to actuate the latter in response to said rarefaction pulses, a fluid containing conduit extending from said transmitter to said receiver, and means for controlling the normal pressure which prevails in said pulse transmitting system between pulses comprising a leak associated with said meter which permits restricted flow of illuminating gas from the meter into and out of said pulse transmitting system, and comprising a second leak associated with said fluid pulse receiver which permits restricted flow of atmospheric air into and out of said pulse transmitting system.

2. In a telemeter register for a meter, the combination of an indicating register adapted to be located relatively remotely from the meter to which it is to respond, a fluid pulse transmitting system between said register and said meter including a fluid pulse transmitter located at the meter and arranged to be actuated thereby, a fluid pulse receiver located at said indicating register and arranged to actuate the latter, a fluid containing conduit extending from said transmitter to said receiver, and means for controlling the normal pressure which prevails in said pulse transmitting system between pulses comprising an expansible and contractible chamber, and a bleeder orifice permitting restricted fluid flow between said pulse transmitting system and said expansible and contractible chamber.

3. In remote indicating apparatus for a fluid flow meter embodying mechanism for measuring fluid flow therethrough, the combination of a remote indicator adapted to be located at a distance from said meter, a pulse transmitting system of the fluid type for transmitting pulses from said meter to said remote indicator, said pulse transmitting system comprising a pulse receiver at said remote indicator, means responsive to the reception of fluid pulses in said pulse receiver for actuating said remote indicator, a fluid containing conduit extending from said pulse receiver to said meter, a pulse transmitter at said meter connected with said fluid containing conduit, said pulse transmitter comprising a reciprocable fluid displacement member, means actuated by the fluid flow measuring mechanism of said meter for actuating said fluid displacement member with a relatively slow motion in one direction and with a relatively quick motion in the other direction, said relatively quick motion creating and transmitting an actuating pulse through said system to said pulse receiver for advancing said register, pressure controlling means for said system comprising a variable capacity chamber provided with an impermeable membrane which permits varying capacities of said chamber but hermetically seal the latter from atmosphere, and a bleeder orifice permitting restricted fluid flow between said chamber and said pulse transmitting system, said bleeder orifice being proportioned whereby it permits leakage from said chamber into said system at a rate which can substantially satisfy the pressure differentials created by the relatively slow motion of said fluid displacement member but cannot satisfy the pressure differentials created by the relatively quick motion of said displacement member.

4. In remote indicating apparatus for a gas meter of the class described provided with a gallery chamber in which flag arms and links transmit operating motion from the measuring bellows to the registering mechanism of the meter, the combination of a remote indicator adapted to be located relatively remotely from said meter, a pulse transmitting system of the fluid type for transmitting stepping pulses from said gas meter to said remote indicator, said pulse transmitting system comprising a fluid pulse receiver at said remote indicator operatively connected to actuate said indicator, a fluid containing pulse extending from said pulse receiver to said gas meter, a fluid pulse transmitter mounted in said gallery chamber comprising a diaphragm chamber having a reciprocable diaphragm, actuating means responsive to the motion of said flag arms and links for driving said diaphragm with a relatively slow motion in one direction and with a relatively rapid motion in the other direction, and pressure controlling means for said pulse transmitting system comprising a gas leak for admitting gas from said gallery chamber into said system and also comprising an atmospheric leak for admitting air from the atmosphere into said pulse transmitting system, said gas leak and said atmospheric leak being proportioned whereby they can substantially satisfy the pressure differentials created by the relatively slow motion of said fluid displacement member but cannot satisfy the pressure differentials created by the relatively rapid motion of said displacement member.

References Cited in the file of this patent

UNITED STATES PATENTS

| Re. 23,800 | Dufour | Mar. 16, 1954 |
|---|---|---|
| 2,084,076 | Brown | June 15, 1937 |
| 2,292,527 | Kraft | Aug. 11, 1942 |
| 2,293,167 | Overbeke | Aug. 18, 1942 |
| 2,340,634 | Wiley | Feb. 1, 1944 |
| 2,553,842 | Bickel | May 22, 1954 |

FOREIGN PATENTS

| 311,174 | Great Britain | May 3, 1929 |